United States Patent
Liao (10) Patent No.: US 12,475,472 B2
(45) Date of Patent: Nov. 18, 2025

(54) METHOD FOR MANAGING GENUINE FABRIC WITH BLOCKCHAIN DATA

(71) Applicant: HENG SHENG INVESTMENT LTD., Tortola (VG)

(72) Inventor: Chih-Wen Liao, Taichung (TW)

(73) Assignee: HENG SHENG INVESTMENT LTD., Tortola (VG)

( * ) Notice: Subject to any disclaimer, the term of this patent is extended or adjusted under 35 U.S.C. 154(b) by 264 days.

(21) Appl. No.: 17/849,985

(22) Filed: Jun. 27, 2022

(65) Prior Publication Data

US 2023/0410128 A1  Dec. 21, 2023

(30) Foreign Application Priority Data

May 25, 2022 (TW) .................................. 111119406

(51) Int. Cl.
- *G06Q 30/018* (2023.01)
- *G06T 7/00* (2017.01)
- *G06T 7/41* (2017.01)
- *H04L 9/00* (2022.01)

(52) U.S. Cl.
CPC ....... *G06Q 30/0185* (2013.01); *G06T 7/0002* (2013.01); *G06T 7/41* (2017.01); *H04L 9/50* (2022.05); *G06T 2207/30124* (2013.01)

(58) Field of Classification Search
CPC ..... G06Q 30/0185; G06T 7/41; G06T 7/0002; G06T 2207/30124; H04L 9/50
USPC ........................................................ 705/318
See application file for complete search history.

(56) References Cited

U.S. PATENT DOCUMENTS

| | | | |
|---|---|---|---|
| 9,811,671 B1* | 11/2017 | Durst | H04L 9/3236 |
| 11,790,418 B1* | 10/2023 | Jay | H04L 63/12 |
| | | | 705/26.1 |
| 2019/0236614 A1* | 8/2019 | Burgin | G06V 10/764 |
| 2019/0251773 A1* | 8/2019 | Boutant | G06F 18/22 |
| 2020/0057876 A1* | 2/2020 | Chang | G06K 19/0723 |
| 2020/0065829 A1* | 2/2020 | Zhu | G06V 20/00 |
| 2020/0334514 A1* | 10/2020 | Chen | B41J 3/407 |
| 2021/0083879 A1* | 3/2021 | Murialdo | H04L 9/3247 |
| 2021/0119771 A1* | 4/2021 | Butters | G06Q 30/0185 |
| 2021/0182518 A1* | 6/2021 | Leng | G06K 7/1417 |
| 2022/0112635 A1 | 4/2022 | Liao | |

(Continued)

*Primary Examiner* — Jessica Lemieux
*Assistant Examiner* — Joshua D Schneider
(74) *Attorney, Agent, or Firm* — MUNCY, GEISSLER, OLDS & LOWE, P.C.

(57) ABSTRACT

A method for managing a genuine fabric with blockchain data comprises the following steps: receiving at least one image of a genuine fabric photographed by a computing device, wherein the image contains at least one anti-counterfeiting texture generated during a manufacturing process thereof, and the computing device performs image analysis on the anti-counterfeiting texture to obtain at least one hash value; forming an smart contract with a text serial number corresponding to the genuine fabric and the hash value by one of a plurality of nodes in a blockchain through the computing device, and launching the smart contract to the nodes; and providing a key to at least one of a fabric production end and a brand sales end, wherein after the smart contract is signed, a non-fungible token which is associated with the genuine fabric is minted at one of the nodes in the blockchain.

6 Claims, 8 Drawing Sheets

(56) References Cited

U.S. PATENT DOCUMENTS

2022/0300950 A1\* 9/2022 Yakovlev ................ G06F 21/31
2022/0327529 A1\* 10/2022 Williams ............. G06Q 20/065

\* cited by examiner

10

| receiving at least one image of the genuine fabric photographed by a computing device, wherein the at least one image contains at least one anti-counterfeiting texture generated during a manufacturing process of the genuine fabric, and the computing device performs image analysis on the at least one anti-counterfeiting texture to obtain at least one hash value; | ~11 | forming a smart contract with the at least one hash value by one of a plurality of nodes in a blockchain through the computing device, and launching the smart contract to the plurality of nodes — 12 providing a key to at least one of a fabric production end and a brand sales end, wherein a non-fungible token is minted from one of the plurality of nodes in the blockchain, and the non-fungible token is sent to each of the plurality of nodes in the blockchain, after the smart contract is signed; and the non-fungible token is associated with the genuine fabric — 13

METHOD FOR MANAGING GENUINE FABRIC WITH BLOCKCHAIN DATA

FIELD OF THE INVENTION

The present invention relates to a method for managing a genuine fabric, in particular to a method for managing a genuine fabric with blockchain data.

BACKGROUND OF THE INVENTION

At present, counterfeiting is prevalent in the fabric market, which affects the revenue and business reputation of brand owners and sellers. Therefore, brand owners and sellers are mostly committed to managing the production of genuine fabrics. Meanwhile, anti-counterfeiting mechanisms are added to fabrics for consumers to identify authenticity of the fabrics. However, the existing anti-counterfeiting mechanism on the market only attaches an anti-counterfeiting identification tag after a fabric is manufactured, which still cannot effectively prevent unscrupulous manufacturers from producing counterfeit fabrics by themselves, or provide consumers with a verification method to correctly judge the authenticity of the fabrics.

Further, in the current market, it is usually difficult for brand owners and sellers to record a production process of the genuine fabric systematically and completely during fabric production. After the genuine fabrics are sold, it is even more difficult for the brand owners and sellers to track circulation of the fabrics. In addition, because fineness of counterfeit goods has increased greatly, it is even more difficult for the brand owners, sellers and consumers to simply identify the authenticity of the fabrics.

On the other hand, at present, when fabric brand owners create non-fungible tokens (NFTs), consumers can't ensure the authenticity of the fabrics associated with the non-fungible tokens because they only conduct Mint on the basis of the fabrics themselves. Once an unscrupulous manufacturer imitates a fake fabric, and then creates the non-fungible token based on the fake fabric, it is even more unfavorable for consumers to judge the authenticity of the fabric. In addition, consumers may buy the non-fungible token created by the fake fabric for this reason.

SUMMARY OF THE INVENTION

A main purpose of the present invention is to solve the problem that it is difficult to manage genuine fabrics in prior art.

Another object of the present invention is to solve the problem that prior art of creating non-fungible tokens only based on a fabric itself is not conducive to consumers' identification of authenticity.

In order to achieve the above purposes, the present invention provides a method for managing a genuine fabric with blockchain data, which comprises the following steps:

first step, receiving at least one image of the genuine fabric photographed by a computing device, wherein the at least one image contains at least one anti-counterfeiting texture generated during a manufacturing process of by the genuine fabric; and the computing device performs image analysis on the at least one anti-counterfeiting texture to obtain at least one hash value;

second step, forming a smart contract with the at least one hash value by one of a plurality of nodes in a blockchain through the computing device, and launching the smart contract to the plurality of nodes; and third step, providing a key to at least one of a fabric production end and a brand sales end, wherein a non-fungible token is minted from one of the plurality of nodes in the blockchain, and the non-fungible token is sent to each of the plurality of nodes in the blockchain, after the smart contract is signed; and the non-fungible token is associated with the genuine fabric.

In an embodiment, first the brand sales end conducts a first transfer of the non-fungible token.

In an embodiment, the blockchain comprises at least a Private Chain and a Public Chain that is able to be connected with the at least one Private Chain; formation and signing of the smart contract are implemented in the Private Chain; and the non-fungible token is minted and issued in the Public Chain.

In an embodiment, the smart contract comprises genuine fabric basic information and a genuine fabric traceability information.

In an embodiment, the genuine fabric traceability information comprises a raw material batch number, a product raw material composition list and a raw material inspection result.

In an embodiment, the smart contract comprises a recycling and reproduction information of the genuine fabric.

In an embodiment, the smart contract comprises a carbon footprint information.

In an embodiment, one of visual images comprised in the non-fungible token is generated by calculating the recycling and reproduction information of the genuine fabric with an algorithm.

Through the implementation of the present invention, compared with the prior art, the present invention has the following characteristic: the anti-counterfeiting texture in the present invention is generated in the manufacturing process of the genuine fabric; it is not limited that the anti-counterfeiting texture is additionally knitted after a semi-finished fabric of the genuine fabric is formed, or the anti-counterfeiting texture is directly knitted in a knitting process of the genuine fabric; and optimally in the present invention, the anti-counterfeiting fabric is not implemented in an additional way, that is, the present invention is implemented in a way of directly knitting the anti-counterfeiting fabric in the knitting process, which is the optimal preference to prevent the fabric from being counterfeited. Further, the present invention generates the at least one hash value based on the anti-counterfeiting texture, and then generates the smart contract and the non-fungible token. In other words, the non-fungible token of the present invention is created based on the anti-counterfeiting texture group, rather than the fabric itself of the genuine fabric. To create the non-fungible token, the brand sales side can reduce generation of counterfeit non-fungible tokens by virtue of characteristics such as decentralization and a non-tampering nature of the blockchain and the non-fungible token. In addition, it is convenient for consumers to trace back to an owner who originally issues the non-fungible token, which is conducive to identifying authenticity of the fabric.

DETAILED DESCRIPTION OF THE PREFERRED EMBODIMENTS

The detail description and technical contents of the present invention are as follow with reference to the drawings.

Figure 1:
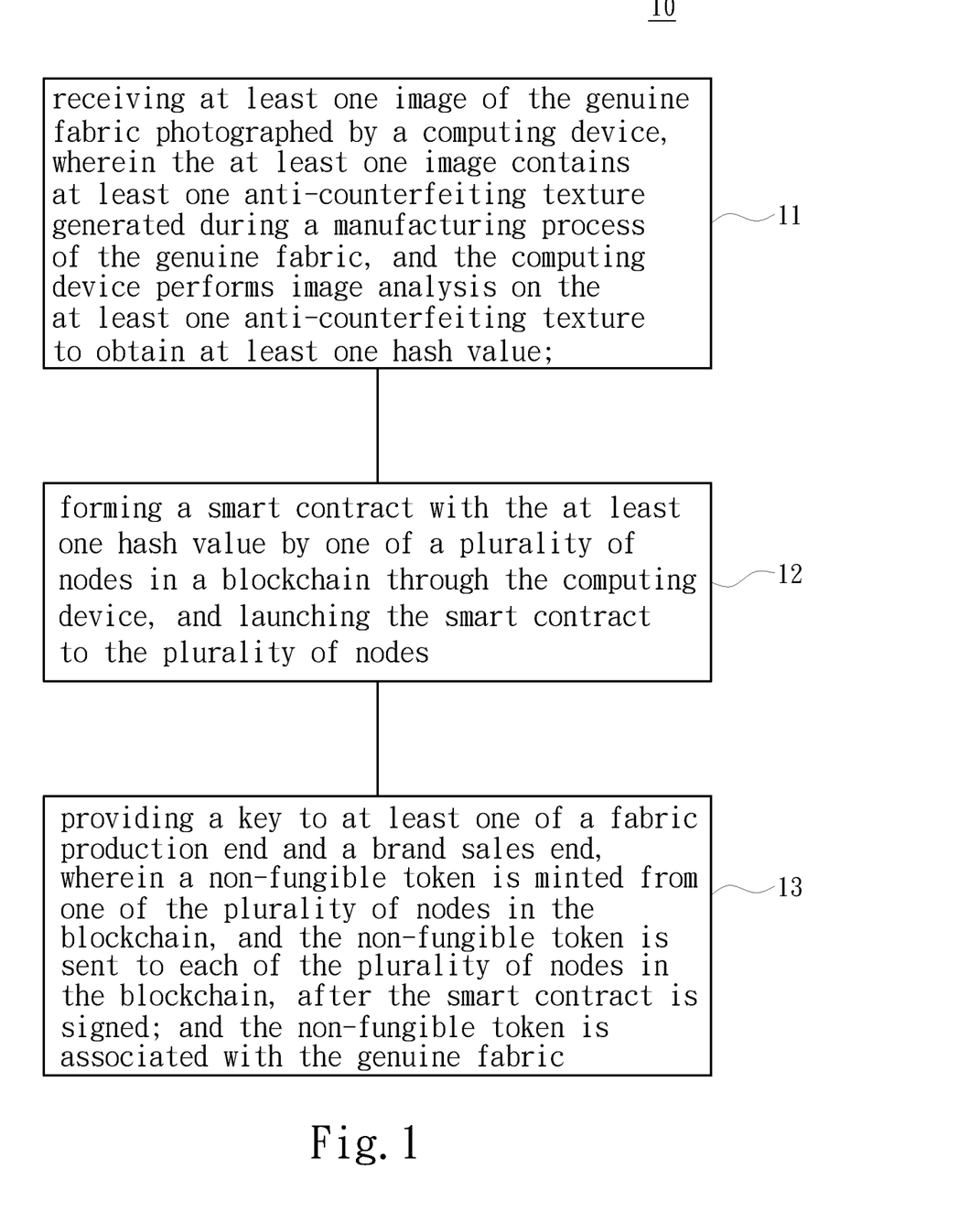
FIG. 1 is a step diagram according to an embodiment of the present invention.
Figure 2:
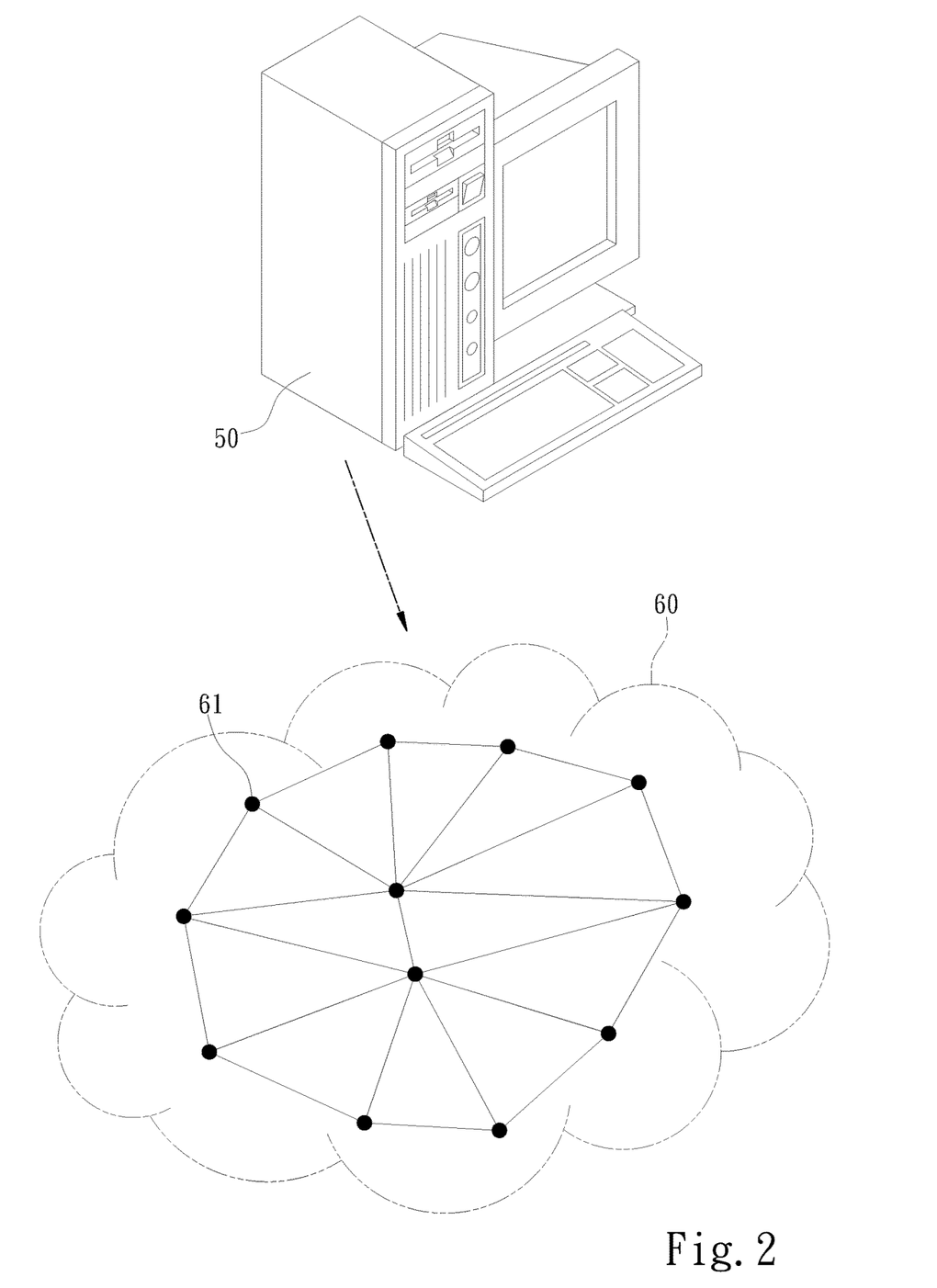
FIG. 2 is a schematic diagram of a computing device and a blockchain according to an embodiment of the present invention.

Referring to FIG. 1, FIG. 2, FIG. 3 and FIG. 4, the present invention provides a method 10 for managing a genuine fabric with a blockchain, including:

first step 11, receiving at least one image 30 of a genuine fabric 20 photographed by a computing device 50, wherein the at least one image 30 contains at least one anti-counterfeiting texture 21 generated by the genuine fabric 20 in a manufacturing process; and the computing device 50 performs image analysis on the at least one anti-counterfeiting texture 21 to obtain at least one hash value;

second step 12, forming a smart contract 40 by a text serial number corresponding to the genuine fabric 20 and the at least one hash value by one of a plurality of nodes 61 in a blockchain 60 through the computing device 50, and launching the smart contract 40 to the plurality of nodes 61; and third step 13, providing a key 70 to at least one of a fabric production end 71 and a brand sales end 72, wherein a non-fungible token (NFT) is minted from one of the plurality of nodes 61 in the blockchain 60, and the non-fungible token is sent to each of the plurality of nodes 61 in the blockchain 60, after the smart contract 40 is signed; and the non-fungible token is associated with the genuine fabric 20.

Figure 3:
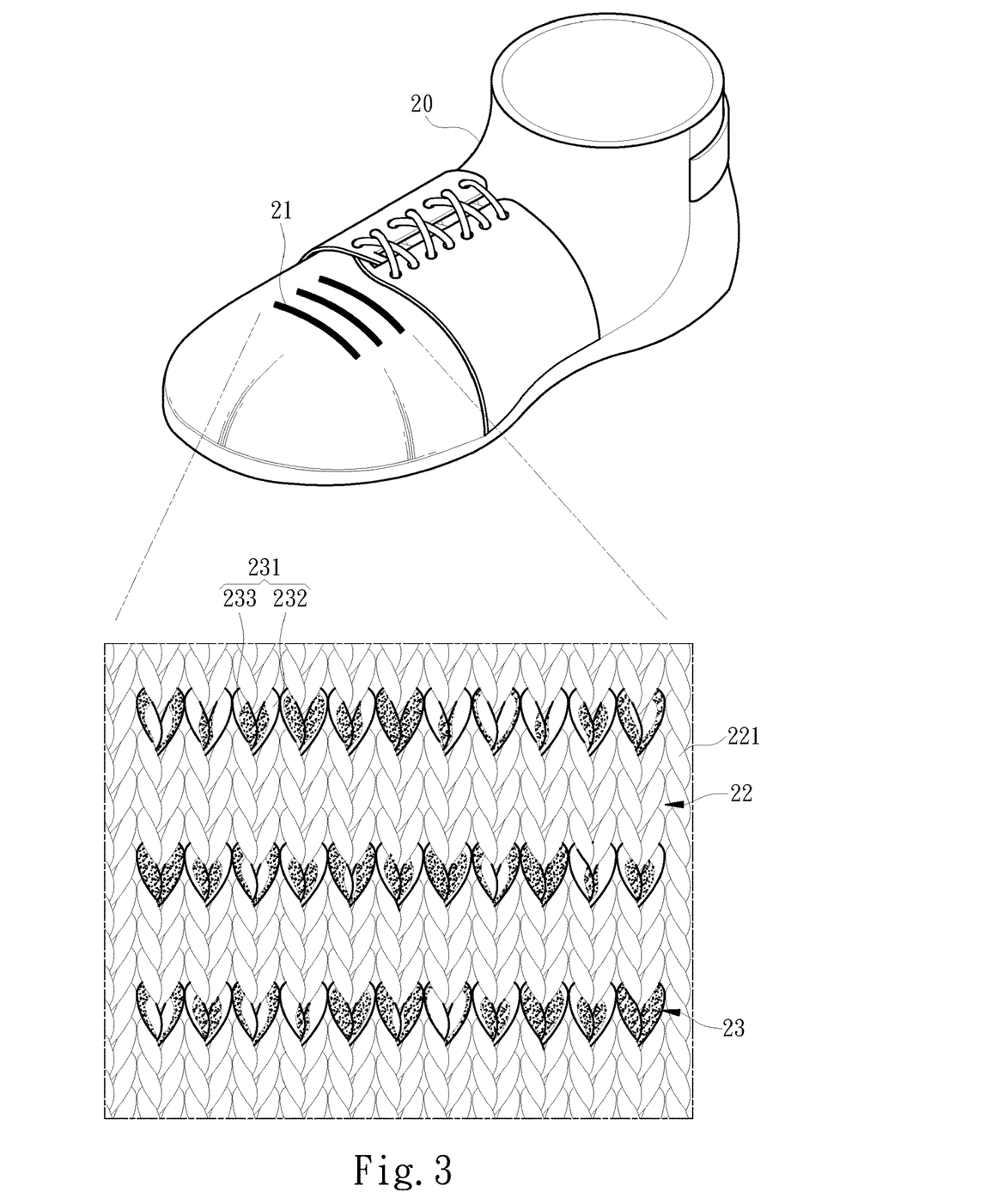
FIG. 3 is a schematic diagram of a genuine fabric according to an embodiment of the present invention.

Before explaining the method 10 of the present invention, the genuine fabric 20 of the present invention will be explained first. Referring to FIG. 3, the genuine fabric 20 may be a clothing, a footwear or a backpack carry, and the genuine fabric 20 is basically knitted by a knitting machine (not shown). The genuine fabric 20 is not limited to whether the at least one anti-counterfeiting texture 21 is formed in an additional way, but a preferably implementation of the present invention is that the at least one anti-counterfeiting texture 21 is directly knitted during a knitting process of the genuine fabric 20, that is, the genuine fabric 20 forms the at least one anti-counterfeiting texture 21 during the knitting process. More specifically, a body of the genuine fabric 20 comprises a plurality of yarn loops 22 which are knitted by at least one first yarn 221. A part of the genuine fabric 20 comprises a plurality of characteristic yarn loops 23 which are formed by a second yarn 231, and the plurality of characteristic yarn loops 23 constitute the at least one anti-counterfeiting texture 21. The at least one first yarn 221 includes at least one yarn, and the second yarn 231 is formed by twisting at least two sub-yarns 232, 233 with different colors. The second yarn 231 is formed by processes such as twisting and space dyeing the at least two sub-yarns 232, 233, so that the second yarn 231 changes colors randomly.

Figure 4:
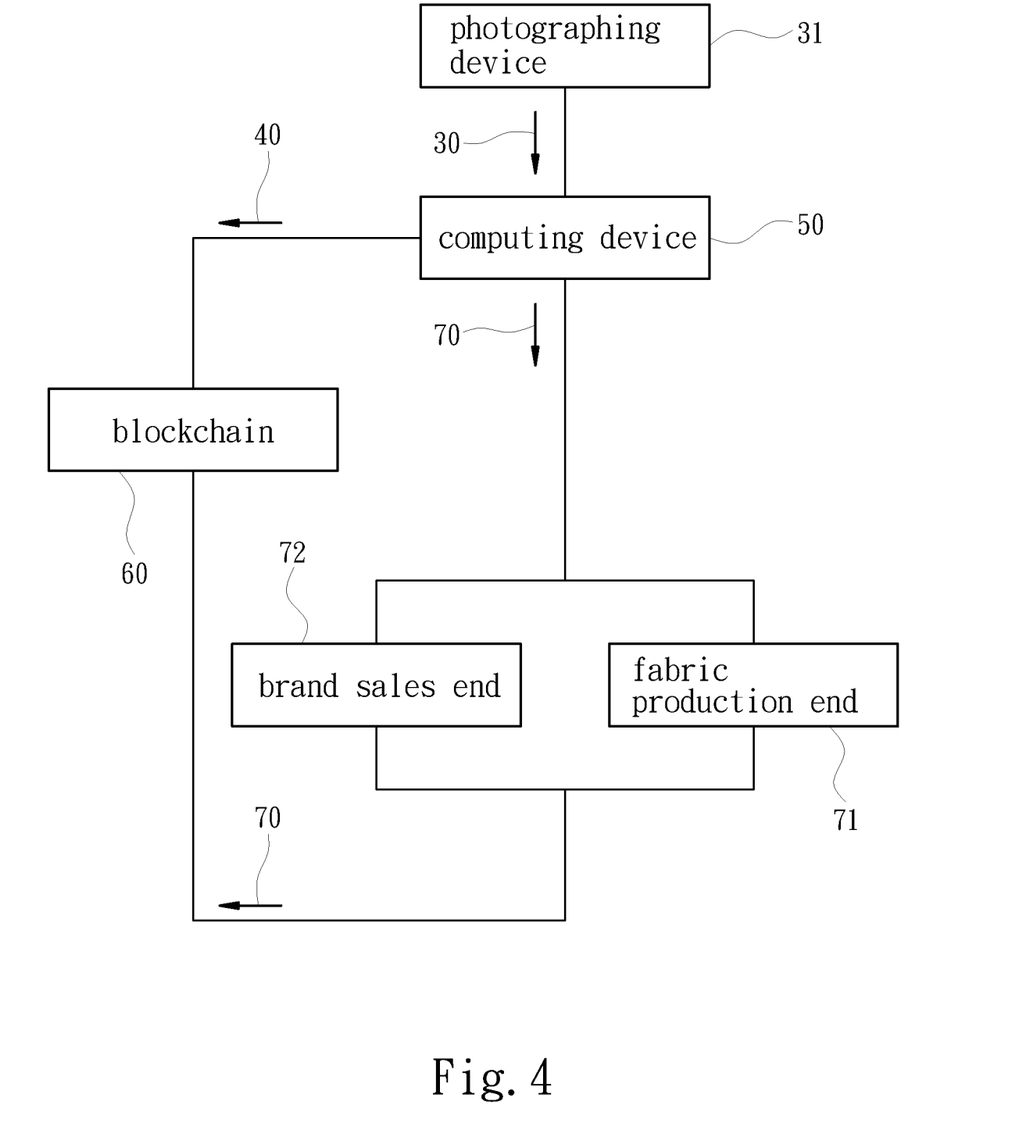
FIG. 4 is a schematic diagram of a unit according to an embodiment of the present invention.

When the second yarn 231 is knitted to form the plurality of characteristic yarn loops 23, each of the plurality of characteristic yarn loop 23 includes color randomness which is difficult to reproduce, thereby making the genuine fabric 20 produce a unique identity certificate. In addition, regarding the genuine fabric 20, the inventor also disclosed the related art in the specification of U.S. patent publication number US20220112635A1.

Back to the present invention, please refer to FIG. 1, FIG. 2, FIG. 3, FIG. 4, FIG. 5, FIG. 6, FIG. 7 and FIG. 8. The method 10 is implemented by the computing device 50 with computing capabilities, and the computing device 50 is served as a window for accessing the blockchain 60. At the beginning, the computing device 50 receives the at least one image 30 of the genuine fabric 20 photographed by a photographing device 31, and the at least one image 30 comprises the at least one anti-counterfeiting texture 21 of the genuine fabric 20. It should be understood that in the present invention, the at least one image 30 may be quantified as a virtual asset, such as the non-fungible token described in the later paragraph of this article and so on. Therefore, the at least one image 30 can be transferred through an abstracted and quantifiable virtual digital asset. Further, the computing device 50 acquires the at least one hash value by analyzing images of the at least one anti-counterfeiting texture 21. For example, the computing device 50 creates the at least one hash value by analyzing a form, a color distribution state, or special wavelength light absorption characteristics of the at least one anti-counterfeiting texture 21 or the like. The computing device 50 may convert an analysis result of the at least one image 30 into small pieces of garbled codes based on a hash function, which can be called the at least one hash value. The at least one hash value is served as a Digital Fingerprint of the at least one image 30. Just like that each person's fingerprint is unique, the at least one hash value proves uniqueness of the at least one image 30. In other words, a main function of the at least one hash value is to provide a one-way encryption function, so as to prevent the analysis result of the at least one image 30 from being backtracked and causing the at least one anti-counterfeiting texture 21 to be copied.

In second step 12, the blockchain 60 is accessed through the computing device 50, and the smart contract 40 is formed in one of the plurality of nodes 61 in the blockchain 60. The smart contract 40 is created based on the at least one hash value and the text serial number corresponding to the genuine fabric 20. The text serial number may refer to a product number of the genuine fabric 20 or a string of characters sufficient to represent the identity of each genuine fabric 20. More specifically, when the genuine fabric 20 refers to one part of a fabric product, the other parts of the fabric product have different text serial numbers each. For example, when the fabric product is a knitted shoe, a tongue and an upper of the knitted shoe have different text serial numbers each. Further, the smart contract 40 contains a plurality of program code functions written the Subject of Contract, Contract Terms, Digital Signature, etc. thereof. The Subject of Contract is served as describing contents of the smart contract 40 and confirming trigger conditions of the smart contract 40; and the Contract Terms represent an execution order of the content of the smart contract 40. For example, the Subject of Contract describes the at least one hash value and the text serial number associated with the genuine fabric 20, and sets a trigger condition of the smart contract 40 that determining the smart contract 40 is signed when the Digital Signature is authenticated, and the smart contract 40 executes an action based on the Contract Terms thereof. Further, based on a characteristic of decentralization of the blockchain 60, the blockchain 60 is regarded as a distributed database. After the smart contract 40 is generated, the smart contract 40 will be launched and recorded by the plurality of nodes 61 in the blockchain 60. In this way, the smart contract 40 cannot be tampered in one of the plurality of nodes 61, but must be modified all the plurality of nodes 61 in the blockchain 60, thereby the smart contract 40 is non-tampering.

Then, in third step 13, the key 70 is provided to at least one of the fabric production end 71 and the brand sales end 72. The key 70 corresponds to the Digital Signature of the smart contract 40, when at least one of the fabric production end 71 and the brand sales end 72 is authenticated by the key 70, the smart contract 40 does not require intervention and verification from a third party; and the key 70 directly triggers signing of the smart contract 40. Then, the non-fungible token is minted by one of the nodes 61 in the blockchain 60 based on the contents and Contract Terms of the smart contract 40. In process of minting, the fabric production end 71 and the brand sales end 72 still own an ownership of the at least one image 30, and the at least one image 30 is converted into an abstracted virtual digital asset that can be quantified and transferred by the smart contract 40. The non-fungible token is produced in the blockchain 60 after minting, and the non-fungible token represents the at least one image 30 to be associated with the genuine fabric 20. Meanwhile, due to the decentralization characteristic of the blockchain 60, the non-fungible token will be sent to the plurality of nodes 61 in the blockchain 60 after being produced, so that the blockchain 60 can record a correlation between the non-fungible token and the genuine fabric 20.

It can be seen from the above that the non-fungible token of the present invention is created based on the at least one anti-counterfeiting texture 21, rather than a fabric of the genuine fabric 20. To create the non-fungible token, the brand sales end 72 is capable of reducing production of counterfeit non-fungible tokens by virtue of characteristics of decentralization and a non-tampering nature of the blockchain 60 and the non-fungible token. Meanwhile, it is convenient for consumers to trace back to an owner who originally issued the non-fungible token, which is conducive to identify authenticity of the fabric. In addition, the at least one anti-counterfeiting texture 21 of the present invention is generated in a manufacturing process of the genuine fabric 20; it is not limited that the at least one anti-counterfeiting texture 21 is additionally knitted after a semi-finished fabric of the genuine fabric 20 is formed, or that the anti-counterfeiting texture 21 is directly knitted during a knitting process of the genuine fabric 20. Optimally in the present invention, the anti-counterfeiting texture 21 is not implemented in an additional way, that is, the at least one anti-counterfeiting texture 21 is directly knitted during the knitting process of the genuine fabric 20, which effectively prevents the fabric from being counterfeited and ensure the authenticity of the manufactured non-fungible token.

Therefore, in one embodiment, the blockchain 60 comprises at least one Private Chain and a Public Chain that can be connected with the at least one Private Chain. Formation and signing of the smart contract 40 are implemented in the Private Chain; and the non-fungible token is minted and issued in the Public Chain. Specifically, because the Private Chain is private and not opening to the public, in order to ensure data confidentiality of the brand sales end 72 and the fabric production end 71 to avoid browsing by irrelevant people, the smart contract 40 is formed and signed in the Private Chain. To make sure that the non-fungible token can be transferred without authorization and verification and recorded in the plurality of nodes 61 at the same time, the non-fungible token is minted and issued in the Public Chain.

In addition, the brand sales side 72 conducts a first transfer of the non-fungible token. Specifically, the first transfer of the non-fungible token is carried out in a Primary Market which can also be referred to as an issuance market. The brand sales end 72 directly sells the non-fungible token to a first-hand buyer after creation, and then the first-hand buyer can trade the non-fungible token in a Secondary Market which can be other transaction platforms such as OpenSea. In this way, the non-fungible token is transferred to other buyers.

Figure 5:
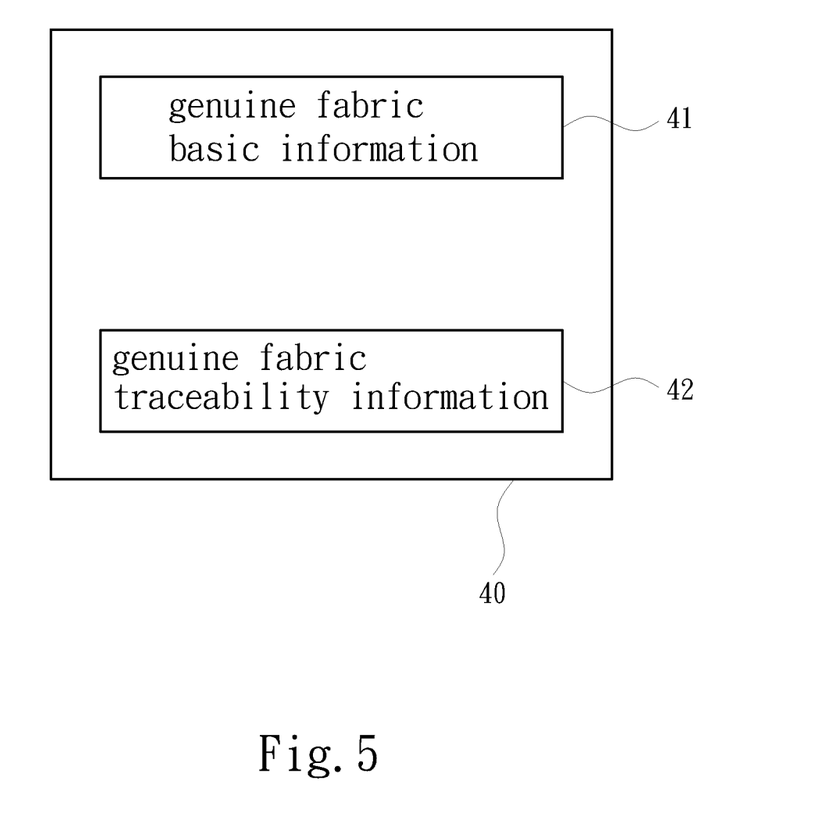
FIG. 5 is a schematic diagram (1) of an smart contract according to an embodiment of the present invention.
Figure 6:
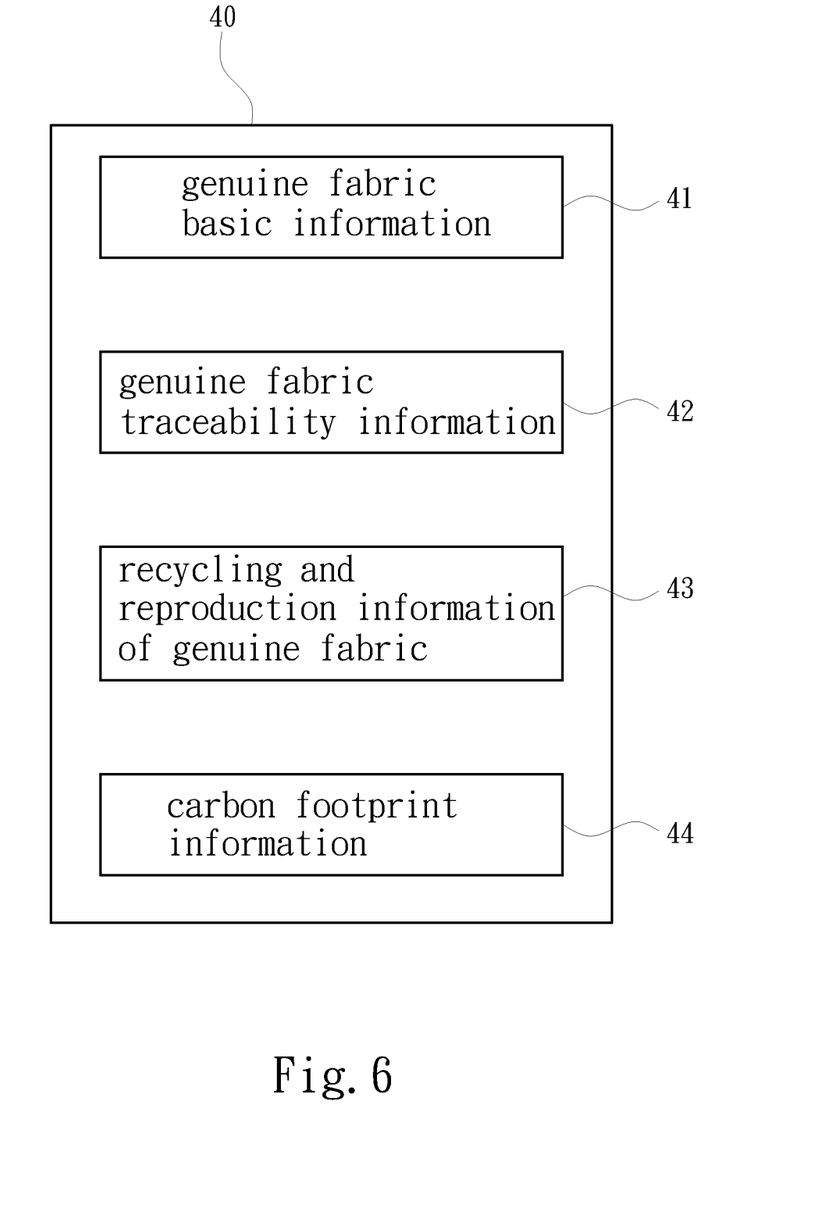
FIG. 6 is a schematic diagram (2) of an smart contract according to an embodiment of the present invention.
Figure 7:
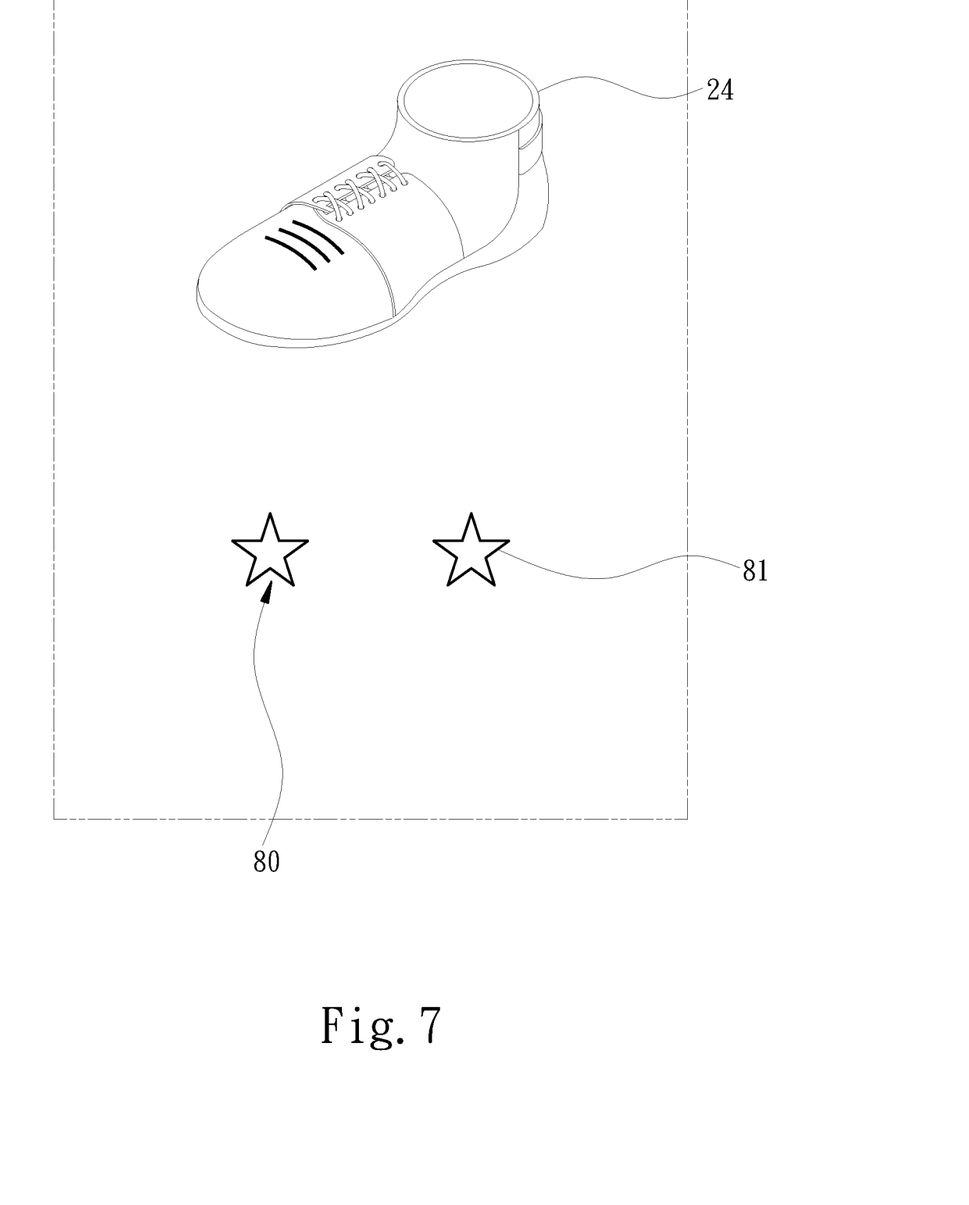
FIG. 7 is a schematic diagram (1) of a visual image according to an embodiment of the present invention.
Figure 8:
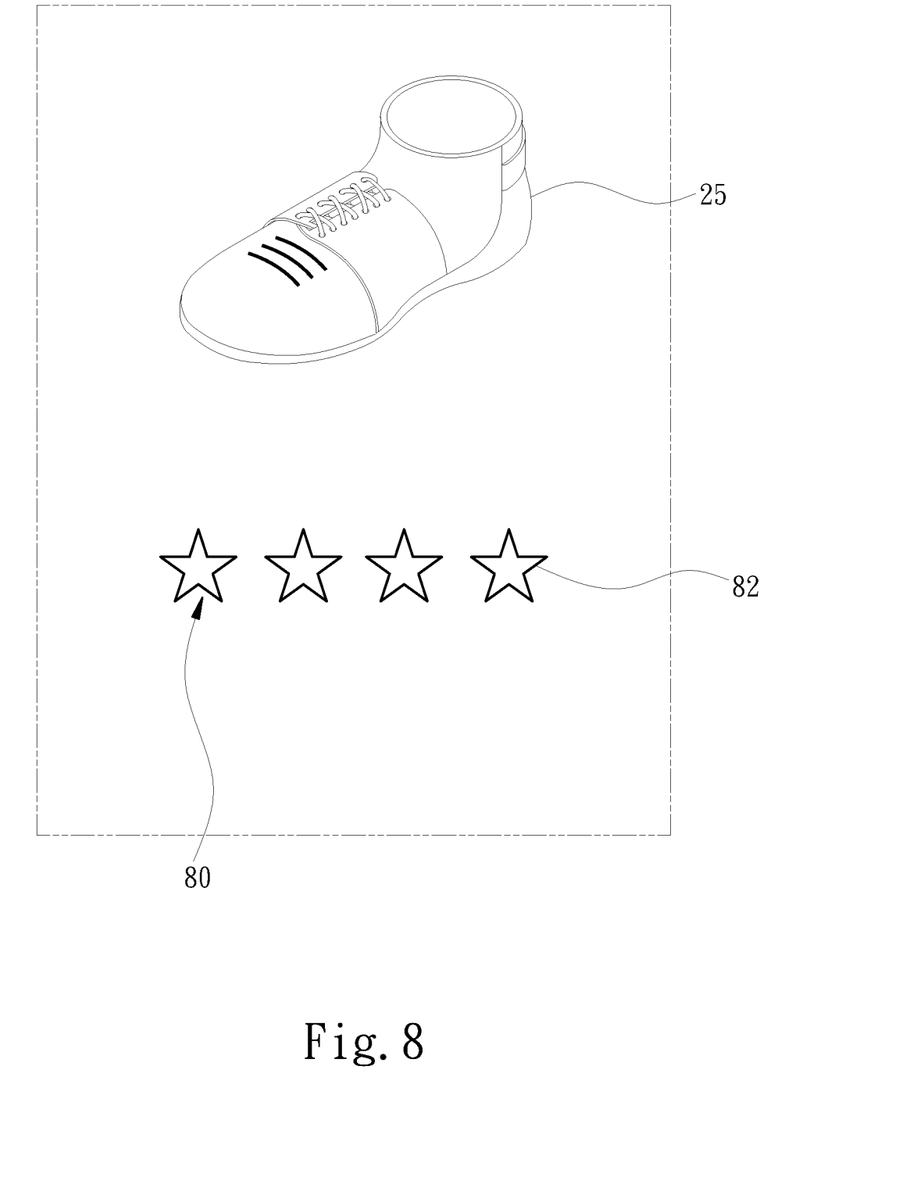
FIG. 8 is a schematic diagram (2) of a visual image according to an embodiment of the present invention.

On the other hand, referring to FIG. 5 and FIG. 6, in order for production information of the genuine fabric 20 to be transparency, in another embodiment, the smart contract 40 comprises a genuine fabric basic information 41 and a genuine fabric traceability information 42, wherein the genuine fabric basic information 41 is served to describe basic data of the genuine fabric 20, such as a style, a color, a size and a number of the at least one anti-counterfeiting texture 21 on the genuine fabric 20, the at least one image 30 of the genuine fabric 20, a transportation mode of the genuine fabric 20, an authentication status of the genuine fabric 20, or a sales status of the genuine fabric 20, etc. The genuine fabric traceability information 42 describes production information of the genuine fabric 20, so as to provide a supply chain for tracing the genuine fabric 20. For example, the genuine fabric traceability information 42 may comprise a raw material batch number, a product raw material composition list, and a raw material inspection result. The raw material batch number describes a batch number of raw yarns provided by a raw material supplier of the genuine fabric 20, and the product raw material composition list describes a composition of raw yarns. For example, when a raw yarn contains multiple materials and colors, the product raw material composition list can describe fiber materials used by the raw yarn, as well as numbers of dyeing vats and dye ingredients of dyeing and finishing in different colors. The raw material inspection result describes a verification result of a raw material yarn after being verified by an external verification organization. For example, the raw material inspection result can describe whether the genuine fabric 20 meets inspection standards of SGS company or whether the result meets the Recycled Claim Standard (RCS).

In addition, in another embodiment, the genuine fabric 20 of the present invention has the characteristics of recycling and reproduction. The smart contract 40 may further comprise a recycling and reproduction information of genuine fabric 43, which describes recycling data of the genuine fabric 20, such as a number of times of recycling and reproduction of the genuine fabric 20, a proportion of materials that use previously recycled fabrics to make the genuine fabric 20, etc. In another embodiment, the smart contract 40 may further comprise a carbon footprint information 44 which describes a carbon footprint of the genuine fabric 20 during transportation. In addition, in order to enhance consumers' willingness for recycling, as well as uniqueness and independence of the non-fungible token (providing that the non-fungible token can be continuously associated with the genuine fabric 20 and can be traded online alone), the non-fungible token of the present invention also comprises at least one visual image 80 which may be a plane image or a 3D stereoscopic image, and the visual image 80 can be generated by calculating the recycling and reproduction information of genuine fabric 43 with an algorithm. When a plurality of visual image 80 are provided, one of the plurality of visual image 80 is generated according to a result of calculating the recycling and reproduction information of genuine fabric 43 with the algorithm Here, the visual image 80 described in this article may be a presentation mode of the non-fungible token. When the genuine fabric 20 is recycled and reproduced more times or the recycling and reproduction ratio is higher, the visual image 80 is changed differently by the algorithm based on the recycling and reproduction information of genuine fabric 43. For example, referring to FIG. 7 and FIG. 8, it is assumed that the genuine fabric 20 is recycled and reproduced more times with a higher recycling and reproduction ratio, the visual image 80 richer. When the genuine fabric 20 is recycled and reproduced for three times, the recycling and reproduction ratio is 30% (as 24 shown in FIG. 7), a visual image will show a pattern of two stars (as 81 shown in FIG. 7); and when the genuine fabric is recycled and reproduced for five times, the recycling and reproduction ratio of 60% for each time (as 25 shown in FIG. 8), a visual image will show a pattern of four stars (as 82 shown in FIG. 8). In addition, under a condition that the visual image 80 is a pattern showing rights and functions of the non-fungible token holded by consumers in a virtual environment, when the genuine fabric 20 is recycled and reproduced more times or the recycling ratio is higher, by the algorithm based on the recycling and reproduction information of genuine fabric 43, the consumers are able to hold the non-fungible token with higher rights and abilities, thereby making the visual image 80 has different changes.

What is claimed is:

1. A method for managing a genuine fabric with blockchain data, comprising the following steps:

first step, receiving at least one image of the genuine fabric photographed by a computing device, wherein the at least one image contains at least one anti-counterfeiting texture generated during a manufacturing process of the genuine fabric; and performing image analysis on the at least one anti-counterfeiting texture to obtain at least one hash value by the computing device, wherein the computing device analyzes a form, a color distribution state, or special wavelength light absorption characteristics of the at least one anti-counterfeiting texture, and generates the at least one hash value based on the form, the color distribution state, or the special wavelength light absorption characteristics;

second step, forming a smart contract with a text serial number corresponding to the genuine fabric and the at least one hash value obtained by analyzing on the at least one anti-counterfeiting texture of the genuine fabric as a subject of contract by one of a plurality of nodes in a blockchain through the computing device, and launching the smart contract to the plurality of nodes, wherein the smart contract comprises a genuine fabric basic information and a genuine fabric traceability information; and third step, providing a key to at least one of a fabric production end and a brand sales end, wherein a non-fungible token is minted from one of the plurality of nodes in the blockchain, and the non-fungible token is sent to each of the plurality of nodes in the blockchain, after the smart contract is signed; and the non-fungible token is associated with the genuine fabric, wherein the brand sales end conducts a first transfer of the non-fungible token.

2. The method for managing the genuine fabric with the blockchain data according to claim 1, wherein the blockchain comprises at least one Private Chain and a Public Chain that is able to be connected with the at least one Private Chain; formation and signing of the smart contract are implemented in the Private Chain; and the non-fungible token is minted and issued in the Public Chain.

3. The method for managing the genuine fabric with the blockchain data according to claim 1, wherein the genuine fabric traceability information comprises a raw material batch number, a product raw material composition list and a raw material inspection result.

4. The method for managing the genuine fabric with the blockchain data according to claim 1, wherein the smart contract comprises a recycling and reproduction information of genuine fabric.

5. The method for managing the genuine fabric with the blockchain data according to claim 4, wherein the smart contract comprises a carbon footprint information.

6. The method for managing the genuine fabric with the blockchain data according to claim 4, wherein one of visual images comprised in the genuine fabric basic information of the non-fungible token is generated by calculating the recycling and reproduction information of genuine fabric with an algorithm.

* * * * *